(12) United States Patent
Landel

(10) Patent No.: US 6,280,310 B1
(45) Date of Patent: Aug. 28, 2001

(54) APPARATUS FOR PUTTING GULLET LIGATURES INTO PLACE

(75) Inventor: Philippe Landel, Lyons (FR)

(73) Assignee: Societe Nouvelle des Establissements Termet Solefi, Champagne (FR)

( * ) Notice: Subject to any disclaimer, the term of this patent is extended or adjusted under 35 U.S.C. 154(b) by 0 days.

(21) Appl. No.: 09/499,637

(22) Filed: Feb. 8, 2000

(30) Foreign Application Priority Data

Feb. 10, 1999 (FR) .................................................. 99 01575

(51) Int. Cl.[7] .......................................................... A22B 5/18
(52) U.S. Cl. ............................................... 452/117; 452/63
(58) Field of Search .................................. 452/117, 118, 452/120, 63

(56) References Cited

U.S. PATENT DOCUMENTS

| | | | |
|---|---|---|---|
| 2,512,290 | * | 6/1950 | Spang ..................................... 452/117 |
| 3,216,055 | | 11/1965 | Palmer et al. . |
| 4,262,387 | * | 4/1981 | Scheier et al. ........................ 452/117 |
| 4,610,050 | * | 9/1986 | Tieleman et al. ..................... 452/117 |
| 5,707,280 | * | 1/1998 | Tieleman et al. ..................... 452/117 |

FOREIGN PATENT DOCUMENTS

| | | |
|---|---|---|
| 479 929 B | 3/1976 | (AU) . |
| 520862 | 3/1982 | (AU) . |
| 39 00 698 A1 | 7/1990 | (DE) . |
| 92 01 720 U | 5/1992 | (DE) . |
| 1 312 788 | 4/1963 | (FR) . |

* cited by examiner

*Primary Examiner*—Willis Little
(74) *Attorney, Agent, or Firm*—Oliff & Berridge, PLC (57) ABSTRACT

Apparatus for putting gullet ligatures into place on ruminants, and in particular on cattle, said apparatus comprising a ring designed to be engaged around the gullet and a rod enabling the ring to be pushed along the gullet to the vicinity of the rumen of the carcass, the apparatus comprising in combination: an actuator suitable for displacing the rod over a length substantially equal to that of the gullet, a device enabling the actuator to be immobilized relative to the gullet, an open ring secured to the end of the rod, and a control device enabling the actuator to be actuated to move the rod in both directions.

23 Claims, 7 Drawing Sheets

FIG_1

FIG_2

FIG_3

FIG_4

FIG_7

FIG_8

APPARATUS FOR PUTTING GULLET LIGATURES INTO PLACE

The present invention relates to apparatus for putting gullet ligatures into place.

BACKGROUND OF THE INVENTION

The term "gullet" is used to designate the esophagus, and in cattle, when the gullet is cut during the slaughtering process, any plant matter that was being digested therein is then ejected, thereby spilling out and soiling the meat.

It is therefore important to be able to discharge into the rumen of the carcass any plant matter that was to be found in the gullet at the moment of slaughter and to close off the gullet as close as possible to the rumen.

Clips for ligating the gullet are already known, which clips are constituted by a kind of clamp which is placed on the gullet of a carcass to avoid soiling the meat when it is eviscerated.

Such a clamp is put into place as follows.

With the slaughtered carcass suspended head down, its throat is incised vertically to reach the gullet which is then taken hold of, and a segment thereof is extracted from the throat.

A split ring is engaged around the gullet and is slid up the gullet to the vicinity of the rumen so as to separate the gullet from all of the ligaments that are attached thereto, after which the ring is brought back down to the end of the gullet and then to the throat.

A ligature clamp is then placed on the gullet and is slid along the gullet up to the rumen.

OBJECTS AND SUMMARY OF THE INVENTION

The present invention seeks to provide an apparatus that is simple and that operates reliably so as to facilitate these operations greatly.

The present invention thus provides apparatus for putting gullet ligatures into place on ruminants, and in particular on cattle, said apparatus comprising a ring designed to be engaged around the gullet and a rod enabling the ring to be pushed along the gullet to the vicinity of the rumen of the carcass, the apparatus comprising in combination: an actuator suitable for displacing the rod over a length substantially equal to that of the gullet, a device enabling the actuator to be immobilized relative to the gullet, an open ring secured to the end of the rod, and a control device enabling the actuator to be actuated to move the rod in both directions.

Having the actuator immobilized relative to the gullet presents the advantage of making it easy to position the apparatus on the carcass regardless of the height at which it is to be found above the ground.

In addition, the apparatus of the invention positions itself automatically, thereby making it easier to orient the rod relative to the gullet, particularly since the weight of the apparatus and the reaction of the gullet on the actuator during displacement of the rod contribute to tensioning the gullet and straightening its portion that extends between the apparatus and the rumen of the carcass.

In a first embodiment of the invention, the device enabling the actuator to be immobilized relative to the gullet is a hook secured to the actuator, which hook is hooked onto the un-severed gullet after it has been pulled out from the carcass through an incision made in the throat.

In a second embodiment of the invention, the device enabling the apparatus to be immobilized relative the gullet is constituted by a clamp which closes on the gullet so as to secure it to the actuator, thereby enabling the apparatus to be used even after the animal has been sacrificed by cutting its throat.

In accordance with the invention, it is advantageous to use a pneumatic actuator with a control device that can cause it to move in both directions.

In the second embodiment, it is advantageous to use the same control button to actuate the device pneumatically, enabling the actuator to be immobilized on the gullet, and then for urging the rod of the actuator into the inside of the carcass.

BRIEF DESCRIPTION OF THE DRAWINGS

In order to make the invention better understood, there follows a description of two embodiments given as non-limiting examples and made with reference to the accompanying drawings, in which.

MORE DETAILED DESCRIPTION

Figure 1:
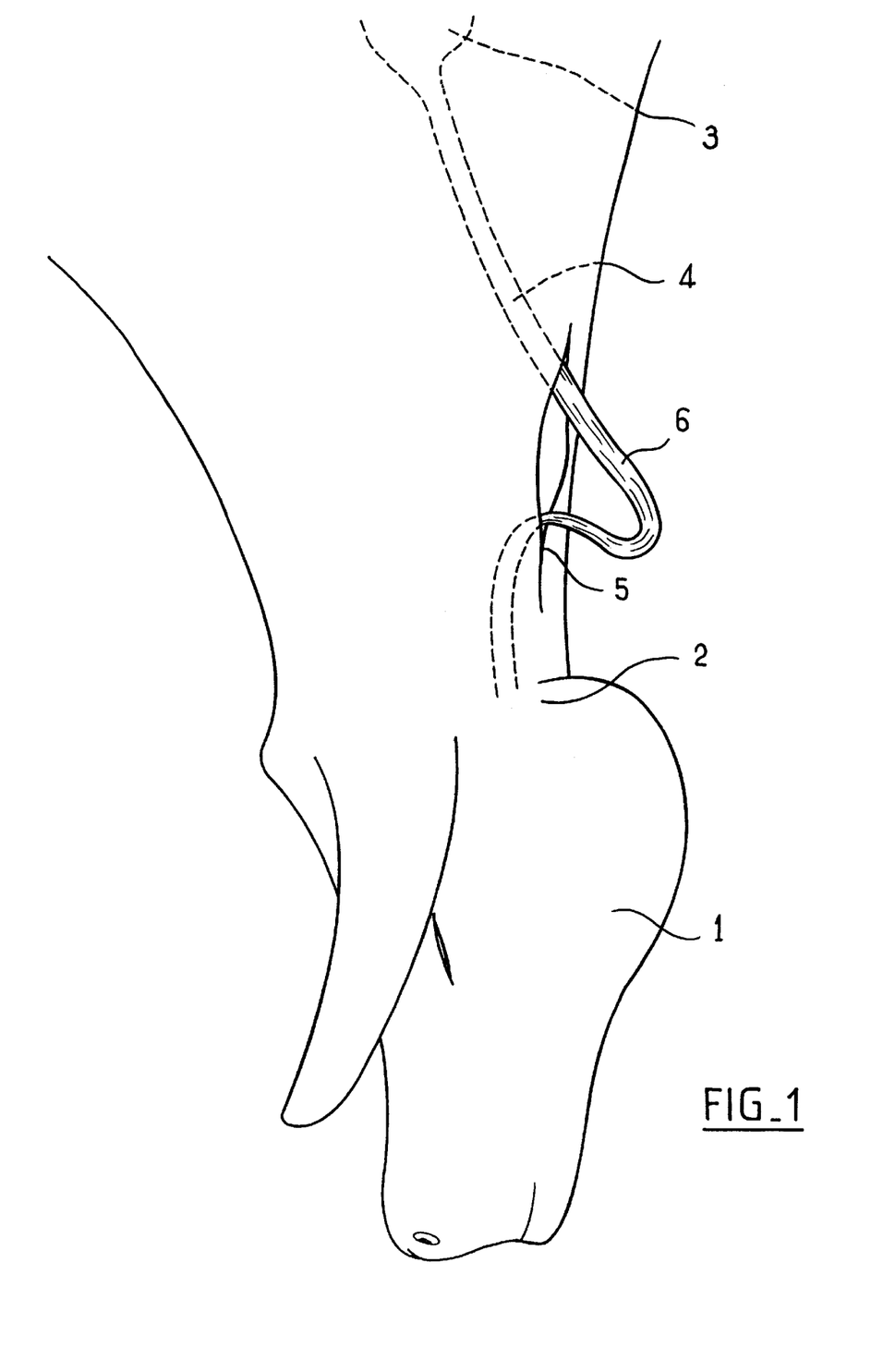
FIG. 1 is an elevation view of the head of a cattle carcass suspended from a slaughter-house chain.

FIG. 1 is a diagrammatic profile view of the head 1 of a cattle carcass.

The throat 2 is connected to the rumen 3 by the gullet 4 which conveys fodder as it is swallowed and regurgitated by the animal while it is feeding and while it is ruminating.

In conventional manner, an incision 5 is made at the base of the throat in order to take hold of the gullet without sectioning it and in order to pull a segment 6 out of the carcass.

Figure 2:
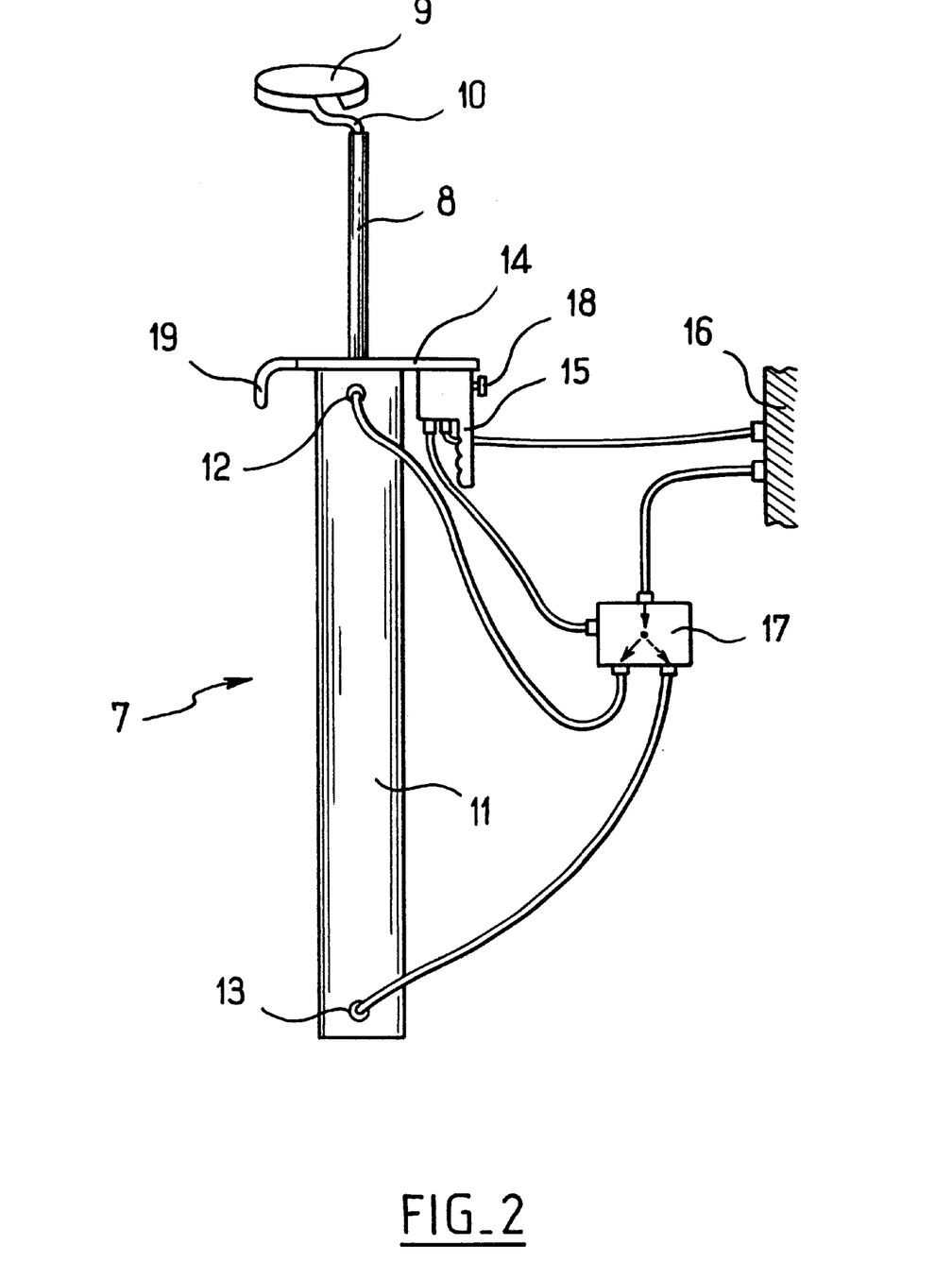
FIG. 2 is an elevation view of apparatus for putting ligatures into place on the gullet in a first embodiment of the invention.

The apparatus 7 shown in FIG. 2 comprises a rod 8 of a length that corresponds substantially to the length of the gullet of a beef carcass, said rod being terminated by a split ring 9 which is connected to the rod 8 by a suitable support 10.

The rod 8 is moved axially by a double-acting pneumatic actuator 11 which is fed with compressed air via each of its ends 12 and 13, thereby enabling the rod 8 to be put into an extended position or into a retracted position.

The actuator 11 is provided with a support 14 having a control handle 15 fixed thereon.

The handle is connected to a source of compressed air 16 and to a valve 17 having two outlet ports enabling the source of compressed air to be connected by means of the control button 18 alternately to one or the other of the two ends of the actuator 11.

When the button is at rest, the two-outlet valve puts the compressed air source 16 into communication with the air inlet 12 of the actuator situated at its rod end so as to cause the rod 8 to be moved into its retracted position, and when the control button 18 is depressed, the two-outlet valve changes position so that compressed air is applied to the other air inlet 13 of the actuator, thereby causing the rod 8 to be extended.

Figure 5:
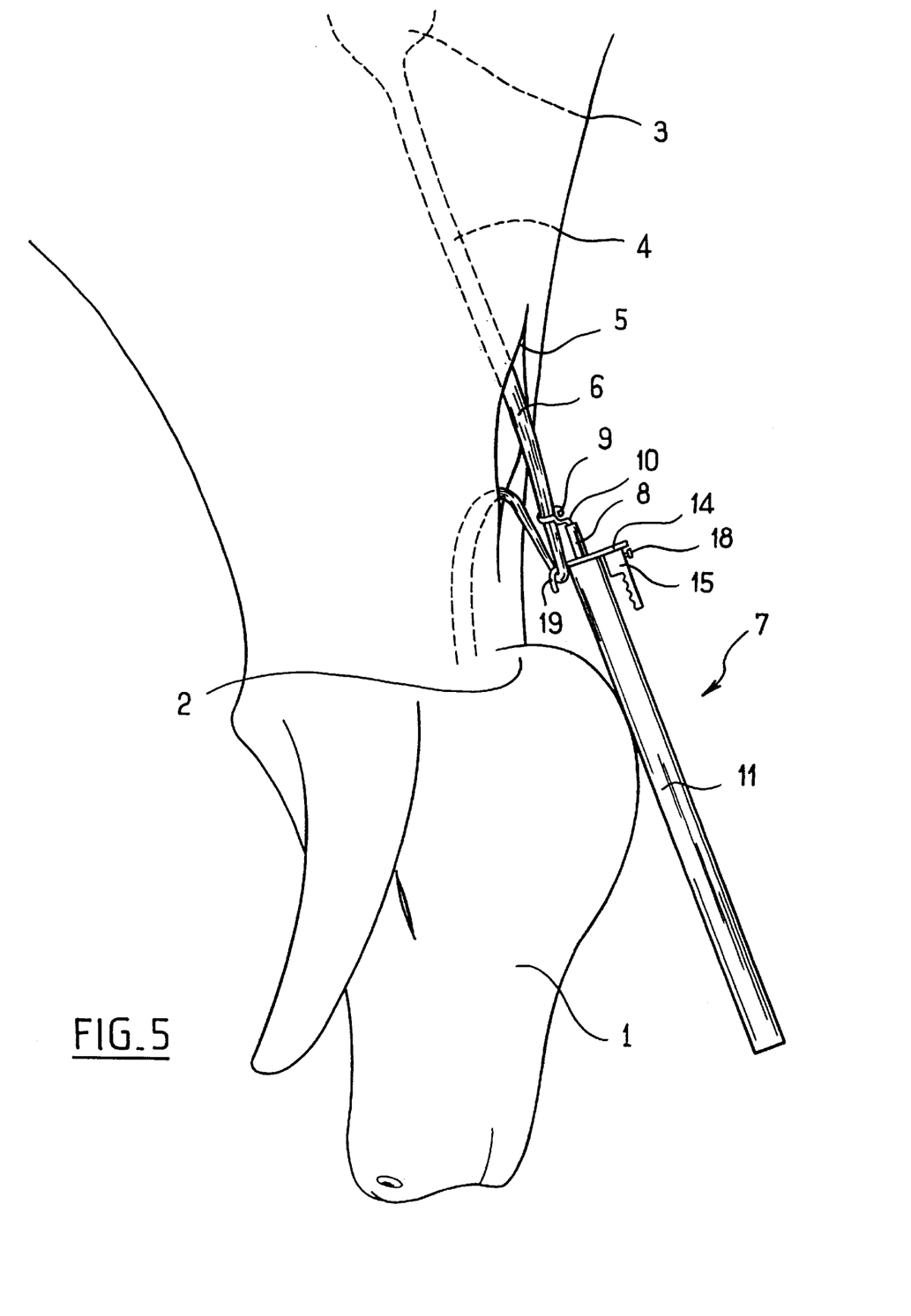
FIG. 5 is a view of the FIG. 1 apparatus hooked on the gullet.

The support 14 is provided with a hook 19 of dimensions suitable for enabling it to engage the gullet so that the apparatus can be suspended therefrom, as shown in FIG. 5.

When the apparatus is suspended from the gullet 4 in this way, the gullet is tensioned between the rumen and the hook 19, thereby straightening it and making it easier to install the ligature clamp.

Figure 3:
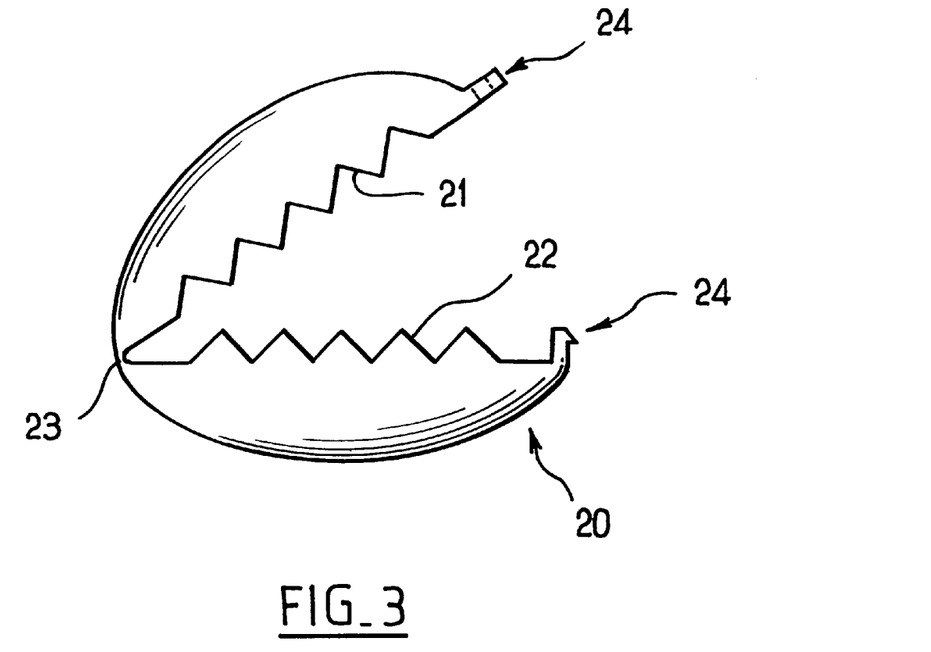
FIG. 3 is an elevation view of a gullet ligature clamp in the open position.
Figure 4:
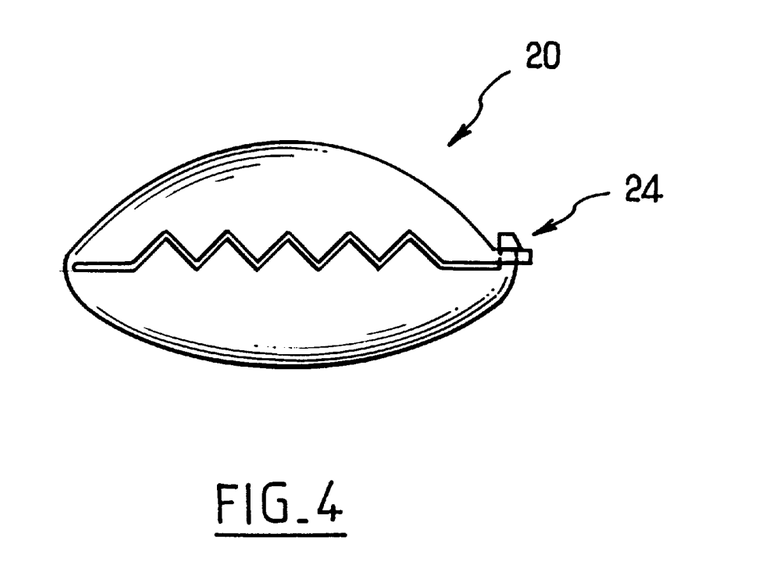
FIG. 4 is a view analogous to FIG. 3 showing the clamp in the closed position.

The ligature clamp 20 which is shown in FIGS. 3 and 4 has two toothed jaws 21 and 22 of complementary shapes which are interconnected by a hinge 23, enabling it to take up an open position and a closed position.

At its end remote from the hinge 23, the clamp 20 has a non-releasable snap-fastening system 24 so as to ensure that the gullet is completely closed off once the clamp has been put into place.

To put the clamp into place, the operator holds the apparatus in one hand while pulling on the gullet with the other hand and engaging it in the open ring 9 situated at the end of the rod, after which the operator hangs the apparatus on the gullet by means of the hook 19, as can be seen in FIG. 5.

Thereafter the operator points the apparatus so that the axis of the actuator is directed towards the rumen 3 of the carcass.

Figure 6:
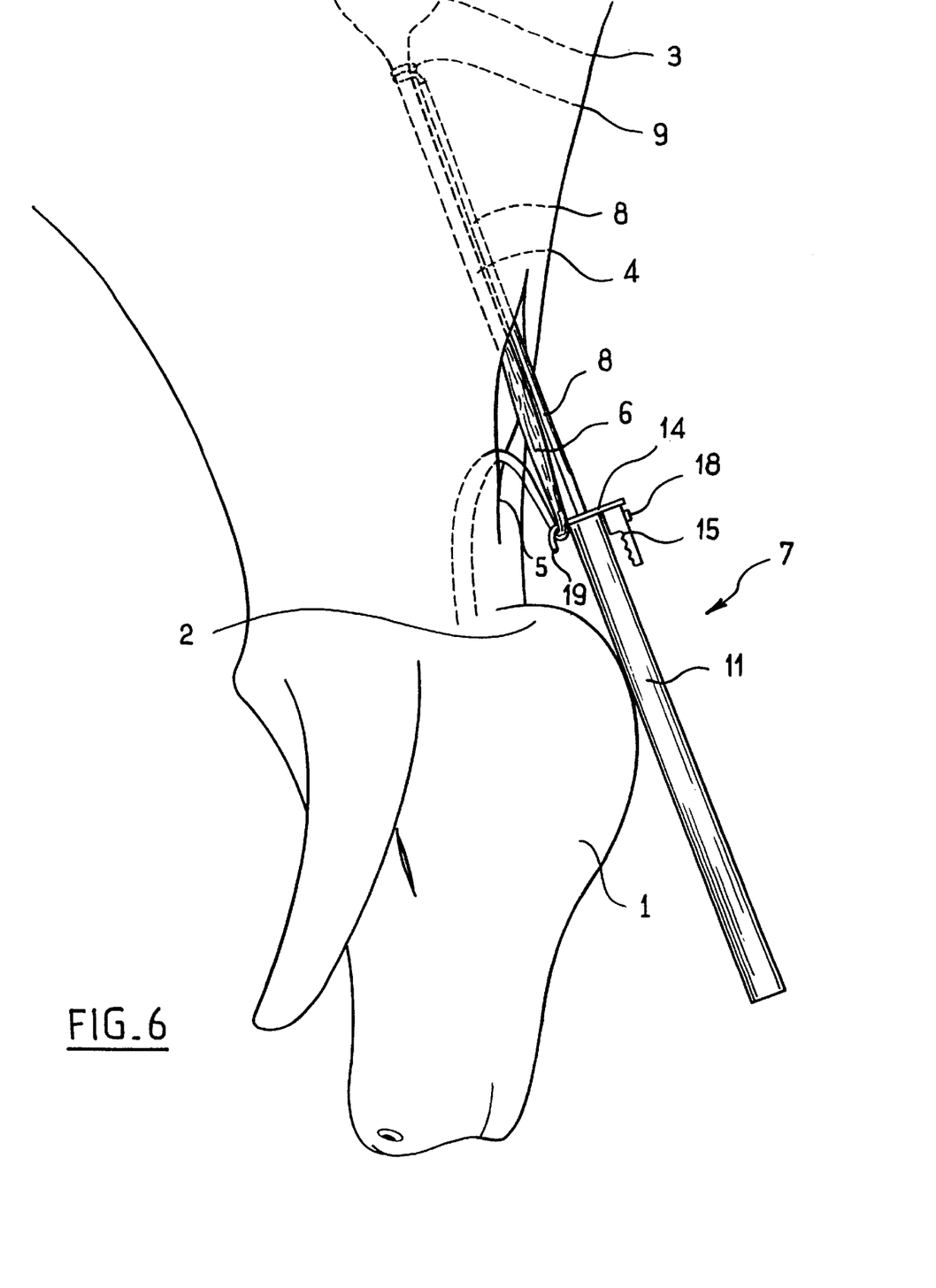
FIG. 6 corresponds to FIG. 5 and shows the rod in the extended position.

By pressing on the control button 18, the operator causes the rod 8 and the ring 9 to move along the gullet to the vicinity of the rumen, as shown in FIG. 6.

Thereafter, the operator releases the control button and the rod returns to its retracted position.

This serves to sever the ligaments connected to the wall of the gullet.

Thereafter, the operator closes a ligature clamp 20 on a portion of the gullet situated above the ring 9 and again presses the control button so as to cause the rod to move upwards a second time, with the ring 9 then pushing the ligature clamp 20 ahead of it so that the clamp takes up a position at the entrance to the rumen 3.

When the control button is released, the rod returns to its retracted position.

All that then remains to be done is to separate the ring from the gullet and to unhook the apparatus from the gullet.

Figure 7:
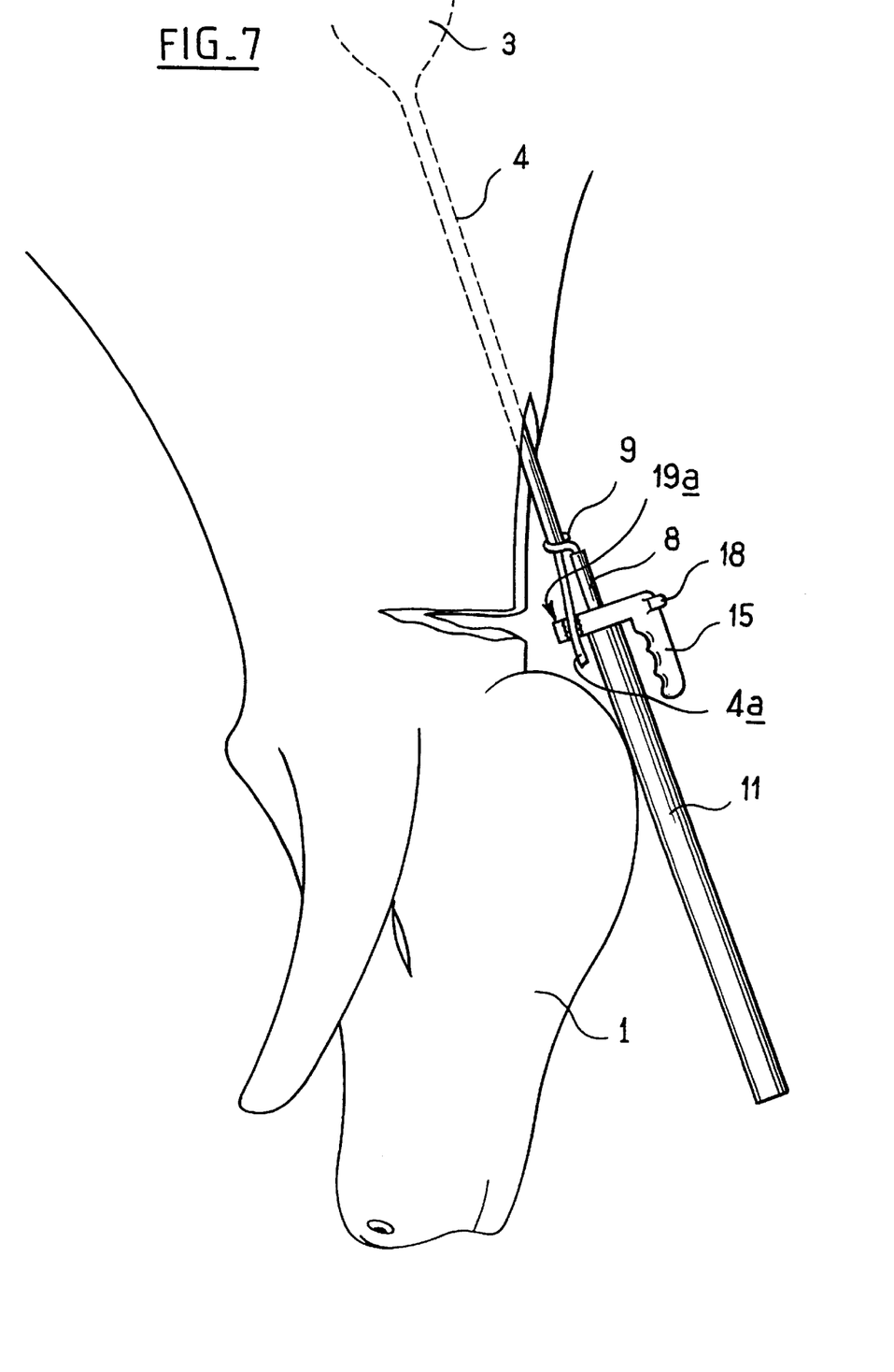
FIG. 7 shows a second embodiment of the apparatus of the invention.

FIG. 7 shows an apparatus constituting a second embodiment of the invention which can easily be used with animals that have been sacrificed by having their throats cut, which means that their gullets have been severed.

Figure 8:
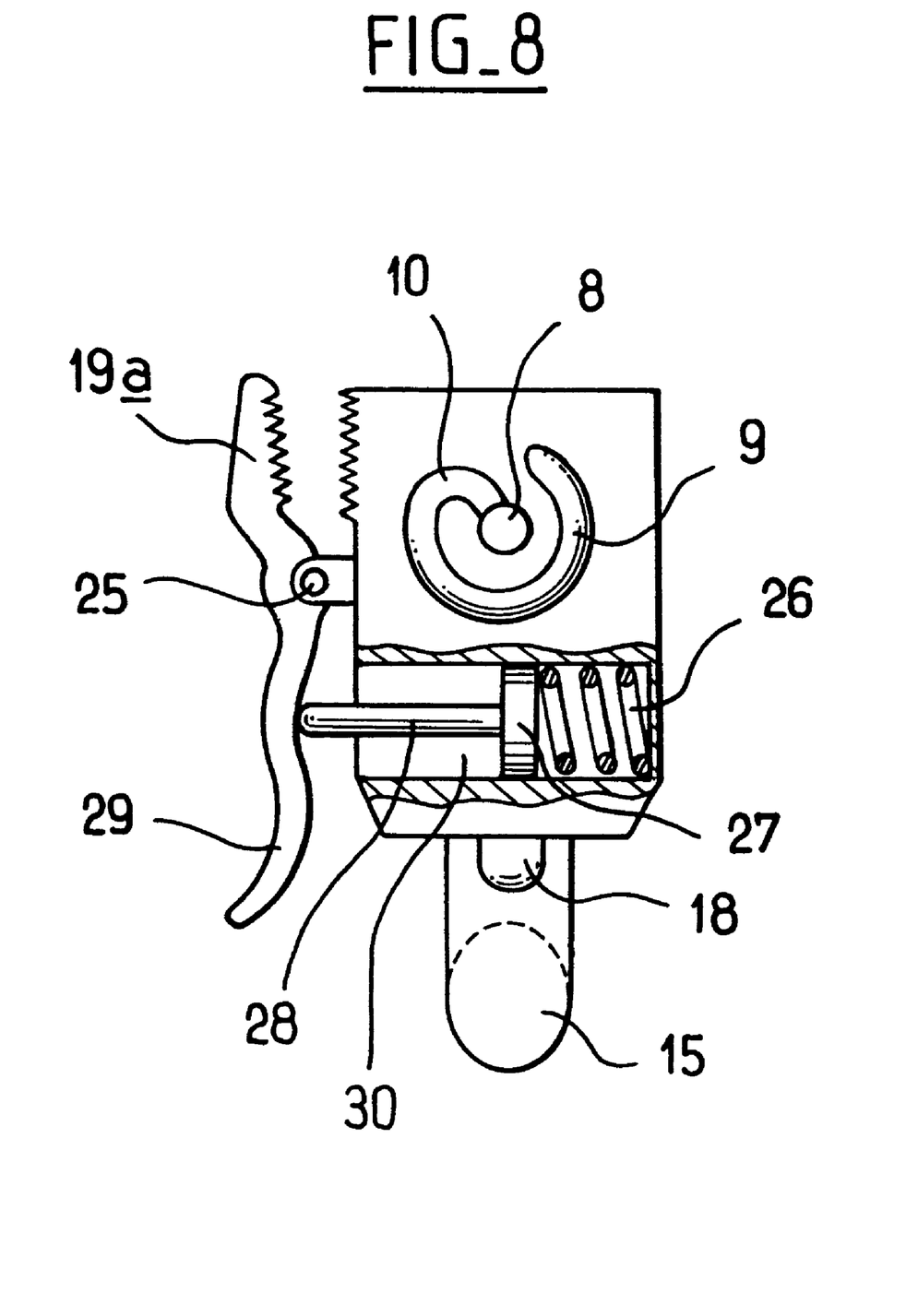
FIG. 8 is a view on a larger scale showing the device for immobilizing the FIG. 7 apparatus on the gullet.

In this embodiment, the hook 19 is replaced by a clamp device of the kind shown in FIG. 8 which is a diagrammatic view on the axis of the rod as seen from the ring end.

In FIG. 8, there can be seen the open ring 9 which is carried at the end of the rod 8 and actuated by the actuator 11, and also the handle 15 and its control button 18.

In this second embodiment, the device for immobilizing the actuator relative to the gullet is constituted by a clamp 19a which is hinged about a hinge 25 and which is urged by a spring 26 acting on a piston 27 whose rod 28 automatically pushes away the handle 29 of the clamp 19a so that it takes up its closed position.

The cylinder 30 of the piston 27 is fed with compressed air simultaneously with the actuator 11.

The user of the apparatus can thus open the clamp 19a manually against the drive of the spring and can engage the severed end of the gullet therein, after which the user releases the handle 29 with the end of the gullet being held securely between the two jaws of the clamp.

Thereafter, it suffices to actuate the button 18 so as to deliver compressed air both to the actuator 11 and to the cylinder 30, thereby ensuring that the end of the gullet is held securely while the ring 9 is being moved towards the rumen.

The process then continues as described above.

Finally, it suffices to press down the handle 19 to release the gullet.

It will be understood that the apparatus in this second embodiment can also be used even when the gullet has not been severed.

Naturally, the embodiments described above are not limiting in any way and can receive any desirable modification without thereby going beyond the ambit of the invention.

In particular, although the description refers to a pneumatic actuator, it would be equally possible to use a hydraulic, electrical, or other device.

What is claimed is:

1. An apparatus for putting gullet ligatures into place on a carcass of a ruminant having a gullet and a rumen, said apparatus comprising an open ring designed to be engaged around the gullet, a rod enabling the ring to be pushed along the gullet to the vicinity of the rumen of the carcass, an actuator configured to displace the rod over a length substantially equal to that of the gullet, a hook secured to the actuator to immobilize the actuator relative to the gullet, said open ring being secured to an end of the rod, and a control device enabling the actuator to be actuated to move the rod in two opposite directions.

2. The apparatus according to claim 1, wherein the hook is configured to be hooked onto an un-severed gullet after the un-severed gullet has been pulled out from the carcass through an incision made in a throat of the carcass.

3. The apparatus according to claim 1, wherein the actuator is pneumatic.

4. An apparatus for putting gullet ligatures into place-on a carcass of a ruminant having a gullet and a rumen, said apparatus comprising an open ring designed to be engaged around the gullet, a rod enabling the ring to be pushed along the gullet to the vicinity of the rumen of the carcass, an actuator configured to displace the rod over a length substantially equal to that of the gullet, a clamp enabling the immobilization of the actuator relative to the gullet, said open ring being secured to an end of the rod, and a control device enabling the actuator to be actuated to move the rod in two opposite directions.

5. The apparatus according to claim 4, wherein said apparatus comprises a control button for actuating the clamp to immobilize the actuator relative to the gullet, and for extending the rod of the actuator into the carcass.

6. An apparatus for putting gullet ligatures into place on a cattle carcass having a gullet and a rumen, said apparatus comprising an open ring designed to be engaged around the gullet and a rod enabling the ring to be pushed along the gullet to the vicinity of the rumen of the carcass, an actuator configured to displace the rod over a length substantially equal to that of the gullet, a hook secured to the actuator to immobilize the actuator relative to the gullet, said open ring being secured to an end of the rod, and a control device enabling the actuator to be actuated to move the rod in two opposite directions.

7. The apparatus according to claim 6, wherein the hook is configured to be hooked onto an un-severed gullet after the un-severed gullet has been pulled out from the carcass through an incision made in a throat of the carcass.

8. The apparatus according to claim 6, wherein the actuator is pneumatic.

9. An apparatus for putting gullet ligatures into place on a cattle carcass having a gullet and a rumen, said apparatus comprising an open ring designed to be engaged around the gullet and a rod enabling the ring to be pushed along the gullet to the vicinity of the rumen of the carcass, an actuator configured to displace the rod over a length substantially equal to that of the gullet, a clamp enabling the actuator to be immobilized relative to the gullet, said open ring being secured to an end of the rod, and a control device enabling the actuator to be actuated to move the rod in two opposite directions.

10. The apparatus according to claim 9, wherein said apparatus comprises a control button for actuating the clamp to immobilize the actuator on the gullet, and for extending the rod of the actuator into the carcass.

11. A method for putting a gullet ligature on a cattle carcass having a gullet and a rumen with an apparatus comprising an open ring engageable around the gullet, a rod for pushing a ligature clamp placed on the gullet toward the rumren of the carcass, an actuator for displacing the rod over a length substantially equal to that of the gullet, a hook to immobilize the actuator relative to the gullet, said open ring being secured to said rod, wherein said method comprises the steps of:
 a) making an incision in the throat of the carcass;
 b) pulling out a portion of the gullet through said incision without severing said gullet;
 c) engaging said open ring on said gullet;
 d) hooking said hook onto the un-severed gullet;
 e) orienting the actuator so that an axis of said actuator is oriented towards the rumen of said carcass;
 f) displacing, using said actuator, the rod and the open ring along the gullet until the open ring reaches the vicinity of the rumen;
 g) displacing, using said actuator, the rod in the opposed direction;
 h) placing a ligature clamp on a part of the gullet located between the open ring and the rumen;
 i) displacing, using said actuator, the rod in the direction of the rumen, so that the open ring pushes the ligature clamp until the latter reaches the vicinity of said rumen;
 j) disengaging the hook from the gullet; and
 k) disengaging the open ring from the gullet.

12. A method for putting a gullet ligature on a ruminant carcass having a gullet and a rumen, comprising:
 a) actuating a rod with an actuator to slide a gullet ligature along the gullet toward the rumen with an open ring secured to one end of said rod;
 b) actuating said rod in an opposite direction with said actuator to retract said open ring from said rumen and leave said gullet ligature in place near said rumen.

13. A method for putting a gullet ligature on a ruminant carcass having a gullet and a rumen, comprising:
 a) securing an actuator to an un-severed gullet of said carcass; and
 b) actuating a rod with said actuator to slide a gullet ligature along the gullet toward the rumen with an open ring secured to one end of said rod.

14. The method according to claim 13, further comprising, after step b), actuating said rod in an opposite direction with said actuator to retract said open ring from said rumen and leave said gullet ligature in place near said rumen.

15. The method according to claim 13, further comprising, between steps a) and b):
 i) actuating said rod with said actuator to slide said open ring toward the rumen; and
 ii) actuating said rod in an opposite direction with said actuator to retract said open ring away from said rumen.

16. The method according to claim 13, further comprising, before step a) making an incision in a throat of said carcass and pulling a portion of the gullet out through said incision without severing the gullet.

17. The method according to claim 16, wherein said ruminant carcass is a cattle carcass.

18. Apparatus for putting a gullet ligature on a ruminant carcass having a gullet and a rumen, comprising:
 a) a rod;
 b) an open ring secured to one end of said rod;
 c) means for securing an actuator to an un-severed gullet of said carcass; and
 d) means for actuating said rod with said actuator to slide a gullet ligature along the gullet toward the rumen with said open ring secured to one end of said rod.

19. The apparatus according to claim 18, further comprising:
 e) means for actuating said rod in an opposite direction with said actuator to retract said open ring from said rumen and leave said gullet ligature in place near said rumen.

20. The apparatus according to claim 18, wherein said means for securing an actuator to an un-severed gullet of said carcass comprises a hook.

21. The apparatus according to claim 18, wherein said rod extends from one end of said actuator, and said hook is attached to said actuator adjacent said one end of said actuator.

22. The apparatus according to claim 18, wherein said ruminant carcass is a cattle carcass.

23. An apparatus for putting gullet ligatures into place on a carcass of a ruminant having an un-severed gullet and a rumen, said apparatus comprising:
 an actuator;
 a rod extending from one end of said actuator and being displaceable by said actuator over a length substantially equal to a length of the gullet;
 an open ring secured to an end of the rod and configured to be engaged around the gullet and to push a gullet ligature along the gullet toward the rumen;
 a hook secured to said one end of the actuator to immobilize the actuator relative to the un-severed gullet; and
 a control device to cause the actuator to selectively move the rod in two opposite directions.

* * * * *